(12) United States Patent
Tonge et al.

(10) Patent No.: US 11,300,425 B2
(45) Date of Patent: Apr. 12, 2022

(54) TURN COUNT DECODING FOR MULTI-TURN SENSORS

(71) Applicant: Analog Devices International Unlimited Company, Limerick (IE)

(72) Inventors: Peter James Tonge, Newbury (GB); Monsoon Dutt, London (GB)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 17/077,662

(22) Filed: Oct. 22, 2020

(65) Prior Publication Data

US 2021/0041267 A1 Feb. 11, 2021

Related U.S. Application Data

(62) Division of application No. 15/936,223, filed on Mar. 26, 2018, now Pat. No. 10,830,613.

(51) Int. Cl.
*G01B 7/14* (2006.01)
*G01D 5/16* (2006.01)

(52) U.S. Cl.
CPC ..................... *G01D 5/16* (2013.01)

(58) Field of Classification Search
CPC ............ G01D 5/145; G01D 5/12; G01D 5/16; G01D 5/165; G01D 5/2448; G01D 5/24485; G01D 5/24461; G01D 5/245; G01D 5/2452; G01R 33/09; G01R 33/91; G01R 33/93; G01R 33/95; G01R 33/96; G01R 33/98
See application file for complete search history.

(56) References Cited

U.S. PATENT DOCUMENTS

| | | | |
|---|---|---|---|
| 4,197,987 A | 4/1980 | Lazzari | |
| 6,707,293 B2 | 3/2004 | Wan et al. | |
| 7,231,313 B2 | 6/2007 | Shonai et al. | |
| 7,884,621 B2 | 2/2011 | Snyder | |
| 9,258,005 B2 | 2/2016 | Motz et al. | |
| 9,455,734 B2 | 9/2016 | Scherr et al. | |
| 10,830,613 B2 | 11/2020 | Tonge et al. | |
| 2003/0128031 A1 | 7/2003 | Doescher | |
| 2009/0326859 A1 | 12/2009 | Hammerschmidt et al. | |

(Continued)

FOREIGN PATENT DOCUMENTS

| | | |
|---|---|---|
| DE | 102010010893 | 9/2010 |
| DE | 102011080050 | 1/2013 |
| JP | 2017-161524 | 9/2017 |

OTHER PUBLICATIONS

Diegel, M. et al., *A New Four Bit Magnetic Domain Wall Based Multiturn Counter*, IEEE Transactions on Magnetics, vol. 45, No. 10 (Oct. 2009), pp. 3792-3795.

(Continued)

*Primary Examiner* — Thang X Le
(74) *Attorney, Agent, or Firm* — Knobbe, Martens, Olson & Bear, LLP

(57) ABSTRACT

Aspects of the present disclosure relate to decoding the output of a multi-turn magnetic sensor using a successive approximation technique to detect a number of turns of a magnetic target. A decoder circuit can decode a turn count of (Continued)

the multi-turn magnetic sensor by obtaining measurements at nodes that are determined from values of previous measurements.

20 Claims, 10 Drawing Sheets

(56) References Cited

U.S. PATENT DOCUMENTS

| | | | |
|---|---|---|---|
| 2010/0321006 A1 | 12/2010 | Suzuki | |
| 2012/0158324 A1 | 6/2012 | Romani et al. | |
| 2013/0015844 A1 | 1/2013 | Bogos et al. | |
| 2013/0015845 A1 | 1/2013 | Fox | |
| 2013/0099708 A1 | 4/2013 | Shimizu et al. | |
| 2014/0184214 A1 | 7/2014 | Schäffer et al. | |
| 2016/0132091 A1 | 5/2016 | Bodner et al. | |
| 2016/0341800 A1 | 11/2016 | Schapendonk et al. | |
| 2017/0261345 A1* | 9/2017 | Schmitt | G11C 11/1653 |
| 2018/0209819 A1* | 7/2018 | Marshall | G01D 5/2454 |
| 2018/0216965 A1* | 8/2018 | Richard | G01D 5/24485 |
| 2018/0372510 A1* | 12/2018 | Mattheis | G01B 7/30 |
| 2019/0195613 A1* | 6/2019 | Zimmer | G01D 5/142 |
| 2019/0242764 A1* | 8/2019 | Nicholl | G01D 5/245 |
| 2019/0293455 A1 | 9/2019 | Tonge et al. | |

OTHER PUBLICATIONS

Diegel, M. et al., *Multiturn Counter Using Movement and Storage of 180° Magnetic Domain Walls*, Sensor Letters, vol. 5:118-122 (2007).

Diegel, M. et al., *QUAD16: the new generation of Multiturn Sensors*, pp. 73-77, MR-Symposium 2009, Institute for Photonic Technology (IPHT), Jena (2009).

Mattheis, et al., *Multiturn Counter Using the Movement and Storage of 180° Magnetic Domain Walls*, IEEE Transactions on Magnetics, vol. 42, No. 10 (Oct. 2006), pp. 3297-3299.

Novotechnik Siedle Group, *How to Substantially Reduce Encoder Cost While Gaining Functionality With Multi-Turn Rotary Position Sensors*, White Paper (8 pgs). Available at: http://www.novotechnik.com/pds/MultiturnWhitePaperV4.pdf (accessed Nov. 4, 2016).

Weiss, et al., *Advanced giant magnetoresistance technology for measurement applications*, Meas. Sci. Technol. 24 (2013) 082001 (17 pp).

U.S. Appl. No. 15/420,719 by Richard et al., filed Jan. 31, 2017.

Office Action dated Apr. 14, 2020 issued in Japanese Application No. 2019-056517.

Notice of Allowance for Japanese Patent Application No. 2019-056517, dated Nov. 2, 2020.

* cited by examiner

TURN COUNT DECODING FOR MULTI-TURN SENSORS

RELATED APPLICATION

Any and all applications for which a foreign or domestic priority claim is identified in the Application Data Sheet as filed with the present application are hereby incorporated by reference under 37 CFR § 1.57. This application is a divisional of U.S. application Ser. No. 15/936,223, filed Mar. 26, 2018 and titled "TURN COUNT DECODING FOR MULTI-TURN SENSORS," the disclosure of which is hereby incorporated by reference in its entirety herein.

FIELD OF DISCLOSURE

The disclosed technology relates to multi-turn magnetic sensors.

BACKGROUND

A magnetic multi-turn sensor can track how many times an object that includes or is coupled to a magnetic target has been turned. An example of a magnetic multi-turn sensor includes a giant magnetoresistance (GMR) sensor.

Magnetoresistance can occur in thin film structures when two ferromagnetic layers are separated by a relatively thin non-magnetic film. When two magnetic layers are parallel, resistance can drop to a minimal value. As the magnetic layers are turned so they are no longer in parallel alignment, electrical resistance can increase. Magnetic sensors can include GMR resistors made with alternating ferromagnetic alloy layers and non-magnetic layers. The resistance of the GMR resistor can be sensitive to and varies with changes in an applied magnetic field. Wheatstone bridges using GMR resistors can be patterned on a semiconductor chip to detect the angular and linear motion of a magnet.

SUMMARY OF THE DISCLOSURE

One aspect of this disclosure includes a system for decoding a turn count of a multi-turn magnetic sensor, the system comprising: a multi-turn magnetic sensor comprising a magnetoresistive track, and a decoder circuit coupled to nodes of the magnetoresistive track. The decoder circuit can be configured to: detect a first pair of signals from a first pair of the nodes, select a second pair of the nodes based on values of the signals from the first pair of the nodes, detect a second pair of signals from the second pair of the nodes, and determine a turn count of the multi-turn sensor based at least in part on the first pair of signals and the second pair of signals.

The system for decoding the turn count of the multi-turn sensor can have one, all, or any combination of the following: the turn count can represent a number of half-turns; the decoder circuit is configured to select the second pair of the nodes based on whether the first pair of signals are both within a predefined range; the magnetoresistive track is laid out in a shape of a spiral, and the decoder circuit is coupled to nodes on opposite sides of a line that extends through a center of the spiral; the first pair of signals are voltages from half-bridge circuits of the multi-turn magnetic sensor; a first bit representing the turn count is decoded based on values of the first pair of signals; the decoder circuit is configured to determine a most significant bit representing the turn count prior to determining other bits representing the turn count; the decoder system is configured to determine the turn count based on measuring signals from up to and including $2^i$ different nodes of the magnetoresistive track, wherein a maximum turn count of the multi-turn magnetic sensor is less than or equal to $2^i$, and i is a smallest integer such that $2^i$ is greater than or equal to the maximum turn count; or wherein the decoder circuit includes a multiplexer configured to select a node from among the nodes of the magnetoresistive track, an analog-to-digital converter configured to generate a digital representation of a signal from the node, and a decoder logic circuit configured to determine the turn count based at least in part on the digital representation of the signal from the node.

Another aspect of this disclosure includes a decoder circuit for decoding a state of a multi-turn magnetic sensor using successive approximation, the decoder circuit comprising circuitry configured to couple to nodes of a multi-turn magnetic sensor, measure pairs of signals from the at least some of the nodes selected using a successive approximation readout technique, and determine a turn count based at least in part on the measured pairs of signals.

The decoder circuit can have one, all, or any combination of the following: the successive approximation readout technique comprises detecting a first pair of signals from a first pair of the nodes, selecting a second pair of the nodes based on values of the signals from the first pair of the nodes, and detecting a second pair of signals from the second pair of the nodes; the first pair of signals are voltage signals from half-bridge circuits of the multi-turn magnetic sensor; a most significant bit representing the turn count is decoded based on values of the first pair of signals; or the decoder circuit is configured to determine the turn count to a half turn resolution.

Another aspect of this disclosure includes a method of decoding a turn count of a multi-turn magnetic sensor, the method comprising: determining a pair of signals for a pair of locations of the multi-turn magnetic sensor; selecting a second pair of locations of the multi-turn magnetic sensor based at least in part on the values of the pair of signals; determining a second pair of signals for the second pair of locations; and decoding the turn count based at least in part on values of the first pair of signals and the second pair of signals.

The method can include one, all, or any combination of: the second pair of the nodes is selected based on whether the first pair of signals are both within a predefined range; a first bit representing the turn count is decoded based on values of the first pair of signals; a most significant bit representing the turn count is decoded prior to determining other bits representing the turn count; the first pair of signals are voltages from half-bridge circuits of the multi-turn magnetic sensor, and the turn count is a half turns count; or the multi-turn magnetic sensor includes a magnetoresistive track laid out in a shape of a spiral, and the pair of locations are on opposite sides of a line that extends through a center of the spiral.

For purposes of summarizing the disclosure, certain aspects, advantages, and novel features have been described herein. It is to be understood that not necessarily all such aspects, advantages, or features are achieved in accordance with any particular embodiment. Thus, the various embodiments may include or optimizes one or more aspects, advantages, or features as taught herein without necessarily achieving other aspects, advantages, or features as taught or suggested herein.

BRIEF DESCRIPTION OF THE DRAWINGS

These drawings and the associated description herein are provided to illustrate specific embodiments and are not intended to be limiting.

DETAILED DESCRIPTION

Figure 1:
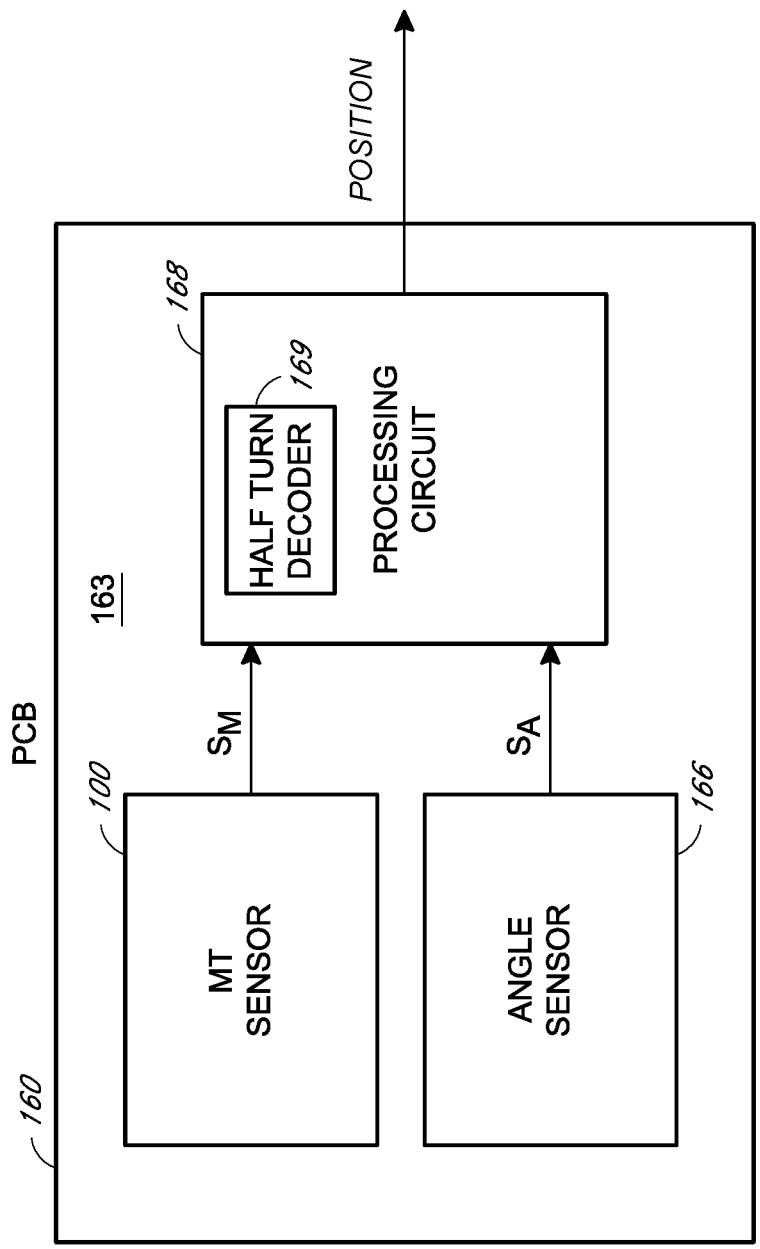
FIG. 1 is a schematic block diagram of a magnetic multi-turn angle sensor system that includes a multi-turn sensor and an angle sensor according to an embodiment.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings. The headings are provided for convenience only and do not necessarily affect the scope or meaning of the claims.

Aspects of this disclosure relate to efficiently decoding a turn count of a multi-turn magnetic sensor. A turn count can be represented by a half turn count (HTC). Successive approximation techniques can be used to decode a turn count of a multi-turn magnetic sensor. Such successive approximation techniques can efficiently determine points on a multi-turn sensor to read to decode the turn count. Outputs from a multi-turn magnetic sensor can be decoded to determine turn count information. This can be done with a half-turn resolution. Such outputs can be bridge voltage outputs from the multi-turn magnetic sensor. The output voltages can represent three states: low, medium, and high. The state that each half-bridge inhabits can be determined by the magnetic angle. Thresholds for these states can be determined by a giant magnetoresistance (GMR) effect of the multi-turn magnetic sensor.

Based on the type of sensor initialization, the turn count information can be calculated by pairing successive half-bridges from a spiral of the multi-turn magnetic sensor and determining the transition from two half-bridges being low to either of the two half-bridges not being low. A successive approximation routine can determine the half-bridges of interest and calculate the turn count information. This can result in a relatively high speed turn count decoding with relatively low power consumption.

To decode a turn count for some multi-turn magnetic sensors using an exhaustive sequential readout technique, all half-bridge voltages from the multi-turn magnetic sensor are measured and re-ordered in the order of the magnetic sequence, that is, the location of the half-bridge in the magnetic spiral of the multi-turn sensor. This can involve an interactive routing of comparing each half-bridge state to the successive half-bridge state to determine the transition from both bridges being low to either of them not being low. Such a method can involve N conversions and comparisons, in which N is the number of half-bridges of the multi-turn magnetic sensor. As an example, for a 40 turn magnetic sensor, the sequential readout technique can be more than 5 times slower and also consume more power relative to successive approximation decoding techniques discussed herein.

Introduction to Magnetic Sensors

Magnetic sensors can be used to monitor the angular position and/or rotational velocity of a moving shaft. Such magnetic sensing can be applied to a variety of different applications, such as automotive applications, medical applications, and industrial control applications, among others. Several technologies exist for making magnetic sensors. For instance, there are Hall-effect sensors. Hall-effect sensors can generate direct current output voltages based on the strength of an applied magnetic field. A rotating magnetic field creates sinusoidal waveforms in Hall-effect sensors which can then be processed by a computer to calculate angle. There are also giant magnetoresistance (GMR) sensors. In a GMR sensor, GMR resistors are formed using layers of ferromagnetic and non-magnetic materials laid out as a magnetoresistance track. The GMR resistors can be used in Wheatstone bridges to sense variations in rotating magnetic fields.

Magnetic sensors can be integrated on a chip for sensing and recording the number of turns in half-turn increments, in which states can change every quarter turn, or for sensing the angle of a rotating magnetic field. A magnetic sensor for sensing and recording the number of turns in increments can be interchangeably referred to as a multi-turn sensor or a multi-turn counter. Multi-turn sensors can count at various resolutions, such as whole turns, half turns, quarter turns, etc., and the multi-turn sensor can change its properties at various increments that may be different than the count resolution. A magnetic sensor for sensing the rotational angle over a range of 360 degrees can be referred to as an angle sensor or as a single turn (360 degrees) angle sensor.

Both a multi-turn sensor and an angle sensor can be used together to determine the rotational angle position that exceeds 360 degrees. This combination of a multi-turn sensor with an angle sensor can also be referred to as a multi-turn angle sensor. For instance, in automotive applications, multi-turn angle sensors can be used for drive-by-wire systems. The angle sensor can detect the steering wheel angle, and a multi-turn sensor can track how many times a steering wheel has been turned. This allows a vehicle control system to differentiate between when a steering wheel is at 45 degrees or 405 degrees, despite the steering wheel being in the same position at both angles.

Additional circuitry can be used to process and/or convert signals from the multi-turn sensor and the angle sensor into position information. For instance, an analog-to-digital converter (ADC) can be used to convert voltages from the sensors into digital data that can be processed to determine the overall rotational angle position and/or angular velocity. The accuracy of these conversions can depend upon many factors including sensor placement, environmental factors such as temperature, and magnetic field strength, to name a few.

The position information can represent rotations of a magnetic field. The magnetic field can be generated by a magnetic target, which can include one or more magnets. Such a magnetic target can be part of or attached to any suitable object, such as a shaft, gear, linear or rotary actuator, a modular clutch actuator (MCA), steering wheel, etc. The position information can represent an angle or rotation, even rotations of more than 360 degrees. Accordingly, the position information can represent an overall angle of rotation an object that includes or is attached to the magnetic target.

The multi-turn sensor can include magnetoresistive sensing elements. For instance, the multi-turn sensor can be a GMR sensor. The angle sensor can include any suitable angle sensor, such as a Hall effect sensor, an anisotropic magnetoresistive (AMR) sensor, other magnetoresistive sensing elements, or the like. The angle sensor can provide an output indicative of an angle in a range from 0 degrees to 360 degrees.

FIG. 1 is a schematic block diagram of a magnetic multi-turn angle sensor system 160 that includes a multi-turn sensor 100 and an angle sensor 166 according to an embodiment. The multi-turn angle sensor system 160 can also include a processing circuit 168 and a printed circuit board (PCB) 163 on which the multi-turn sensor 100, the angle sensor 166, and the processing circuit 168 are disposed. The processing circuit 168 can receive signal(s) $S_M$ from the multi-turn sensor 100 and signal(s) $S_A$ from the angle sensor 166 and then process these received signals to provide a rotational angle position Position. The processing circuit 168 can include a half-turn decoder 169. The half-turn decoder 169 can receive signal(s) $S_M$ from the multi-turn sensor 100 and output a half-turn count. The half-turn decoder 169 can implement successive approximation decoding and/or any suitable principles and advantages discussed herein related to decoding a turn count of the multi-turn sensor. The signal(s) $S_M$ from the multi-turn sensor 100 and the signal(s) $S_A$ from the angle sensor 166 can be analog signals. For instance, the signal(s) $S_M$ from the multi-turn sensor 100 can be voltage signals derived from resistor networks, such as Wheatstone bridges including GMR resistors.

Figure 2:
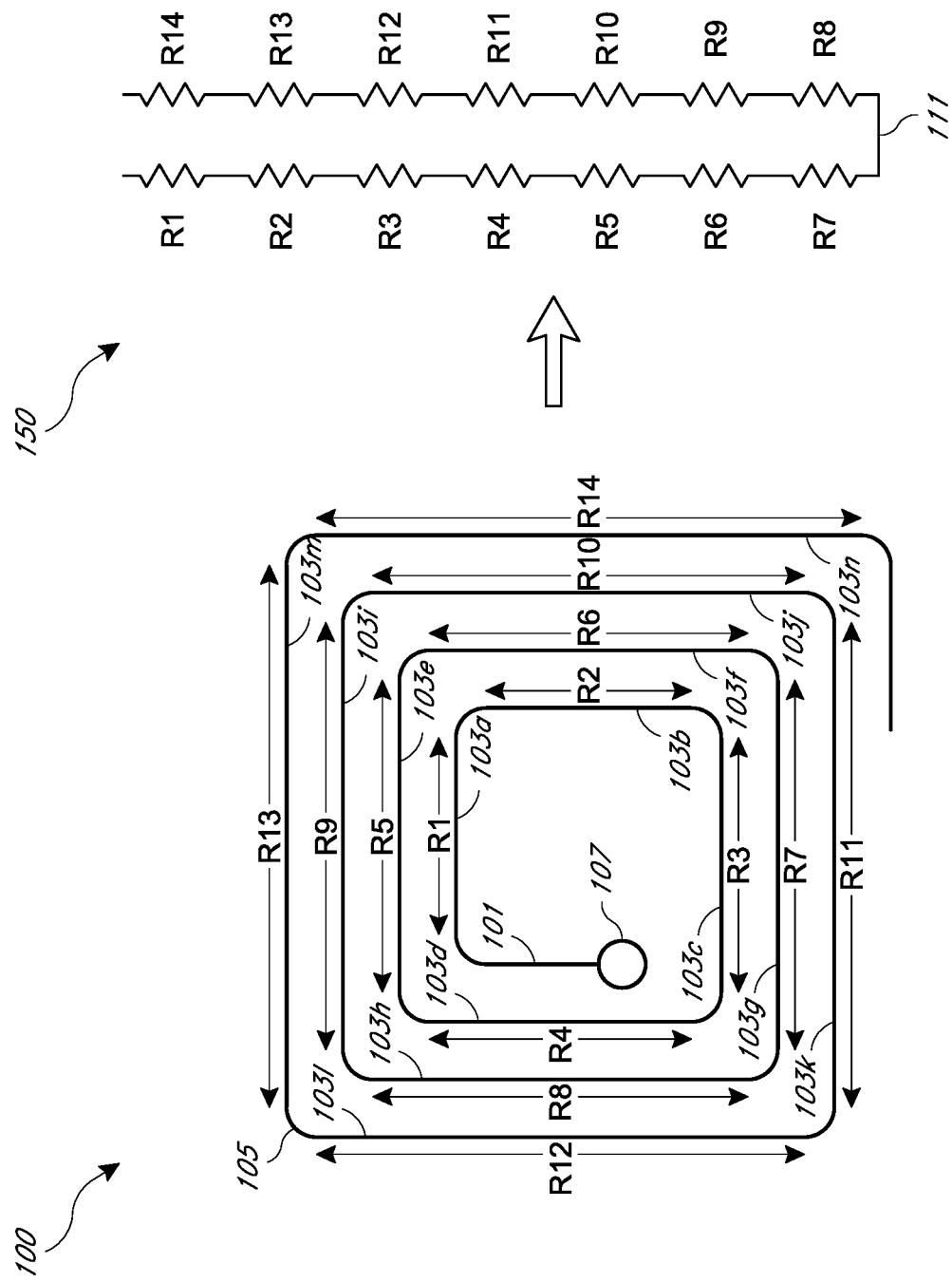
FIG. 2 shows an example magnetic strip layout representation of a multi-turn sensor with a corresponding circuit schematic representation according to an embodiment.

FIG. 2 shows an example magnetic strip layout representation of a multi-turn sensor 100 with a corresponding circuit schematic representation 150. In the embodiment of FIG. 2, a magnetic strip is patterned on a chip as a giant magnetoresistance track 101 that is physically laid out in the shape of a spiral. The magnetoresistive track 101 has corners 105 and segments 103a to 103n forming magnetoresistive elements R1 to R14 arranged in series with each other, and a domain wall generator 107. The magnetoresistive elements can act as variable resistors that change resistances in response to a magnetic alignment state. The magnetoresistive track 101 of the multi-turn sensor 100 illustrated can be implement in a multi-turn counter that can count at least 3 turns. The magnetoresistive track 101 can have a magnetic anisotropy, such as a high anisotropy, based on the material and cross sectional dimensions of the magnetoresistive track 101. The magnetoresistive track 101 can store magnetic energy.

A domain wall generator (DWG) 107 is coupled to one end of the magnetoresistive track 101. The DWG 107 can have a magnetic anisotropy, such as a low anisotropy. The DWG 107 can be affected by a magnetic field. As the external magnetic field turns, the DWG 107 can inject domain walls through the magnetoresistive track 101. The domain wall can propagate through the segments, causing magnetic domain orientations of the segments to change. Each half turn of the magnetic field (up to a maximum number of half turns) will cause the domain walls to be positioned such that the resistances of the segments 103a to 103n of the magnetoresistive track 101 to be in a unique sequence.

The segments 103a to 103n of the magnetoresistive track 101 are shown as straight sides of the magnetoresistive track 101 in the example of FIG. 2. The segments 103a to 103n can have a variable resistance based on the magnetic domain of each respective segment. As the orientation of a magnetic domain of a segment changes, the resistance of that segment can change. Accordingly, the segments 103a to 103n can operate as magnetoresistive elements, also referred to as variable resistors R1 to R14, respectively, herein. The magnetoresistive elements R1 to R14 can also function as non-volatile, magnetic memory that can be magnetically written and electrically read. The magnetoresistive elements R1 to R14, as laid out in the spiral shaped magnetoresistive track 101, are coupled in series with each other. Corresponding circuit schematic representation 150 shows segments 103a to 103n depicted as corresponding magnetoresistive elements R1 to R14, respectively, connected in series.

A multi-turn sensor can provide various outputs that can be uniquely decoded into a half-turn count. For instance, the multi-turn sensor 100 can provide various half-bridge output signals, which can be voltages. The voltages can be measured at different locations, such as from the different corners 105 of the multi-turn sensor. The measured voltages can be stored by the half turn decoder 169 of FIG. 1. Then, the half turn decoder 169 can, based on which corners have which voltages (and/or on the sequence of currents or resistances that correspond to the voltages according to V=I*R), determine a number of half turns of the magnetic field that caused the sequence of resistances to appear. In some embodiments, the number of half turns can be determined according to a routine or by referencing a pre-populated lookup table stored in a memory.

Decoding the Multi-Turn Sensor

With respect to FIG. 1 and FIG. 2, the multi-turn sensor 100 can be in the shape of a spiral, and the signals $S_M$ can provide the half turn decoder 169 a voltage reading across segments or corners of the multi-turn sensor 100.

A half turn decoder can sequentially receive voltage measurements at the ends of the segments (e.g., the corners or opposite corners) such as shown in FIG. 2, from one end of the multi-turn sensor to the other. Then, based on the voltage readings for each segment, the half turn decoder can decode a number of half turns. Although examples in this disclosure may relate to half turns, any suitable principles and advantages discussed herein can be applied to decoding a turn count with any suitable resolution for a particular application, such as a whole turn, half turn, quarter turn, etc. Moreover, although examples in this disclosure involve voltage measurements, any other suitable signal can be measured for a particular application, such as a current signal for an application that can decode a turn count using a current measurement.

Each voltage reading takes time and consumes power. When a relatively long sequence of voltages is read, the amount of time and power used for decoding the multi-turn sensor can become relatively large. Some relatively large multi-turn sensors have long tracks for counting a relatively large numbers of turns. For relatively large multi-turn sensors, sequentially reading the voltages from one end of the large multi-turn sensor to the other end consumes large amounts of power and takes large amounts of time. Reading outputs in parallel may provide faster speeds at the cost of using significantly more chip area. This does not necessarily provide any power savings.

A faster, more energy efficient method can be used to decode the multi-turn sensor 100 using a successive approximation readout (SAR) technique. The half turn decoder 169 of FIG. 1 can implement the SAR technique. Recognizing that the sequence of domain walls generated by the movement of the DWG includes unique subsets for different half turns, those unique subsets can be identified and the number of half turns can be decoded without determining the orientations of all of the domain walls (e.g., without determining the resistances of all of the segments or without determining the voltages of all of the corners of GMR spiral).

The signals $S_M$ in FIG. 1 can include pairs of voltages taken from different parts of the multi-turn sensor 100. For example, the half turn decoder 169 can receive a first pair of voltages from a first pair of corners of the multi-turn sensor 100, and then the half turn decoder 169 can receive a pair of voltages from a different pair of corners of the multi-turn sensor 100, and so on such that the half turn decoder 169 iteratively receives a sequence of pairs of voltages. In each iteration, the half turn decoder 169 can be configured to read the voltages and use the reading to determine which of the corners of the multi-turn sensor to read in the next iteration. The half turn count can be determined in substantially less iterations according to the equation:

$$HTC_{max} \leq 2^i \qquad \text{Equation 1}$$

In Equation 1, $HTC_{max}$ indicates a maximum number of half turn counts that a multi-turn sensor 100 is configured to detect, and i indicates the number of iterations where i is the smallest positive integer that satisfies the equation. During each iteration, a value for a bit in a binary representation of a number of half turns can be decoded. For example, a magnetic sensor for detecting 0-127 half turns (or 64 turns or 128 half turns) could be decoded in 7 iterations ($2^7=128$). Notably, the integers from 0-127 can be represented as a 7-bit binary number. In some embodiments, voltages can be read from up to two different nodes during each iteration such that up to $2^i$ voltage readings are performed to decode a half turn count. The iterative technique can be performed substantially faster than reading voltages from each of the corners of the corresponding 128 half-turn sensor and also performed using less power. Significant benefits can be realized when decoding a multi-turn sensor for measuring 8 or more half turn counts.

Example Readout Structure

Figure 3:
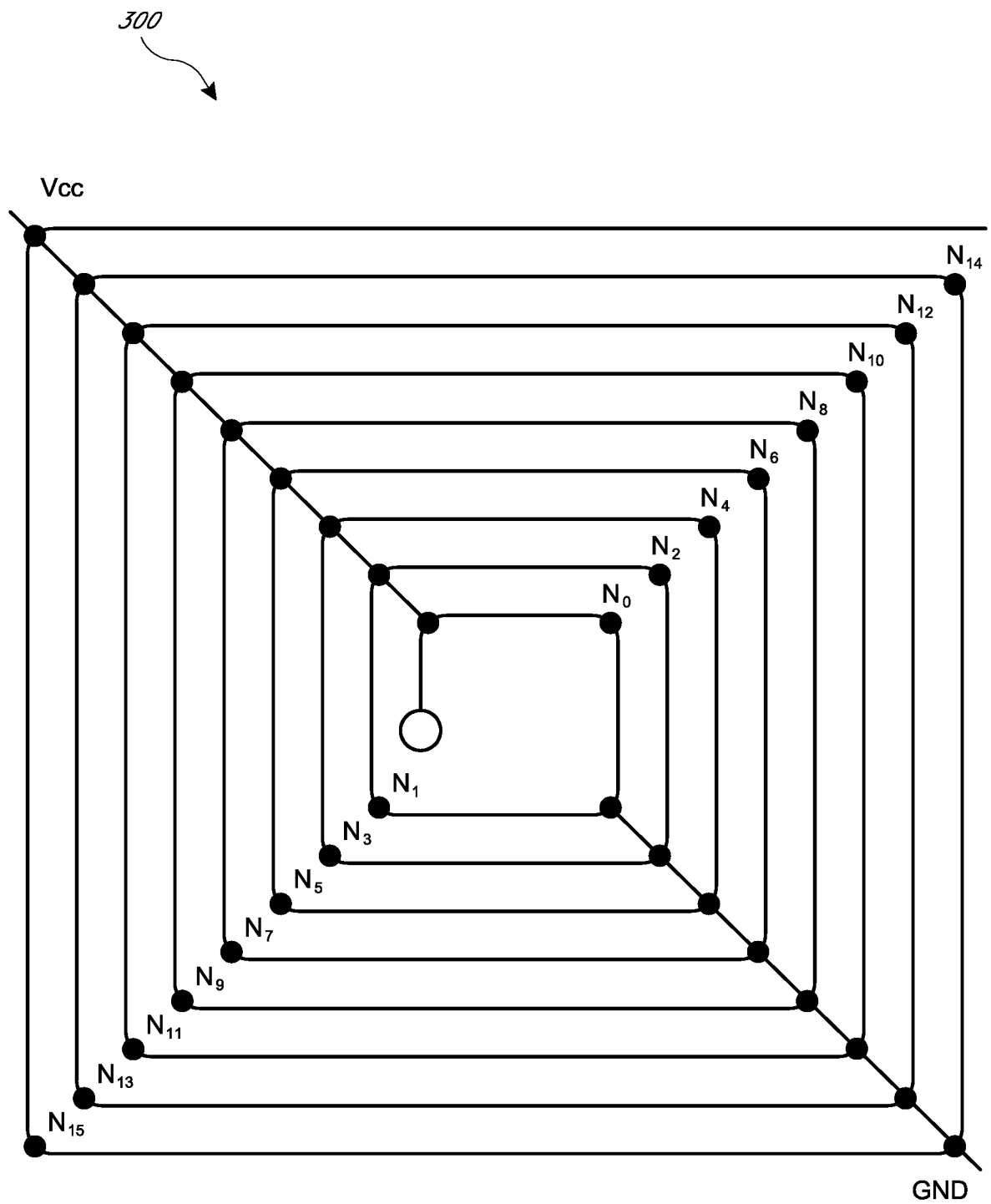
FIG. 3 shows an example multi-turn sensor with an example readout structure according to an embodiment.

FIG. 3 shows a multi-turn magnetic sensor 300 with an example readout structure. The multi-turn magnetic sensor 300 includes a plurality of magnetoresistive elements (similar to R1 to R13 of FIG. 2 but not re-labeled in FIG. 3 for clarity) and a plurality of nodes $N_0$-$N_{15}$ at which voltages can be measured, detected, and/or read from as the outputs of half Wheatstone bridges. Half Wheatstone bridges can alternatively be referred to as half-bridges. A voltage rail Vcc having a first voltage is coupled to top left corners of each loop of the spiral. The bottom right corners of each loop of the spiral are coupled to a second voltage, such as ground (GND).

The multi-turn magnetic sensor 300 includes loops of rings. For example, a first loop can start at the innermost Vcc node and continue clockwise until the next Vcc node is reached. The magnetoresistive segments in each loop can be thought of as variable resistors in a Wheatstone bridge. Other embodiments can include differential voltage rails, such as Vcc on a first voltage rail and a different voltage on the second voltage rail.

The voltages of the nodes $N_0$-$N_{15}$ can be measured in pairs. A voltage at a node can be measured and it can be determined whether the measure voltage is within a voltage range. For example, a first "low" voltage can be determined if the voltage is within a first range (such as below −50 mV), a second "medium" voltage can be determined if the voltage is within a second range (such as from −50 mV to 50 mV), and a third "high" voltage can be measured if the voltage is in a third range (such as 50 mV or higher). In some embodiments, the SAR technique can include detecting whether a voltage is within a voltage range (such as "high") or not. Such embodiments may not involve distinguishing between other voltages (such as "medium" and "low").

In various embodiments, the voltage ranges can vary based on the values of the power rail(s) and/or the resistances of the segments of the GMR spiral. In some embodiments, the "low," "medium," and "high" ranges can be different for nodes in different loops of the spiral. In various embodiments, the spiral can include more loops and be configured to detect greater numbers of half turns. In various embodiments, the DWG can be on either end of the multi-turn magnetic sensor 300.

A successive approximation readout technique can be used to sequentially read pairs of voltages and decode a binary number indicating a half turn count. In a first iteration, a readout of first measured voltages from a first pair of nodes of a magnetoresistive track can be performed. The first pair of nodes can be nodes toward a middle loop of the spiral or nodes that correspond to the number of bits used to indicate the half turn count. The first, most significant bit of the half turn count can be decoded based on the first measured voltages (e.g., whether the voltages are both high, both low, or different values such as high and low). The next pair of nodes to be read during the next iteration can also be selected based on the measured voltages from the first pair of nodes (e.g., whether they are both high, both low, or different values). Then, during the next iteration, the next pair of nodes can be read, and the next bit of the half turn count can be decoded (e.g., whether they are both high, both low, or different values such as high and low). The iterations can continue until a sufficient number of nodes are read to uniquely decode the half turn count.

Figure 5:
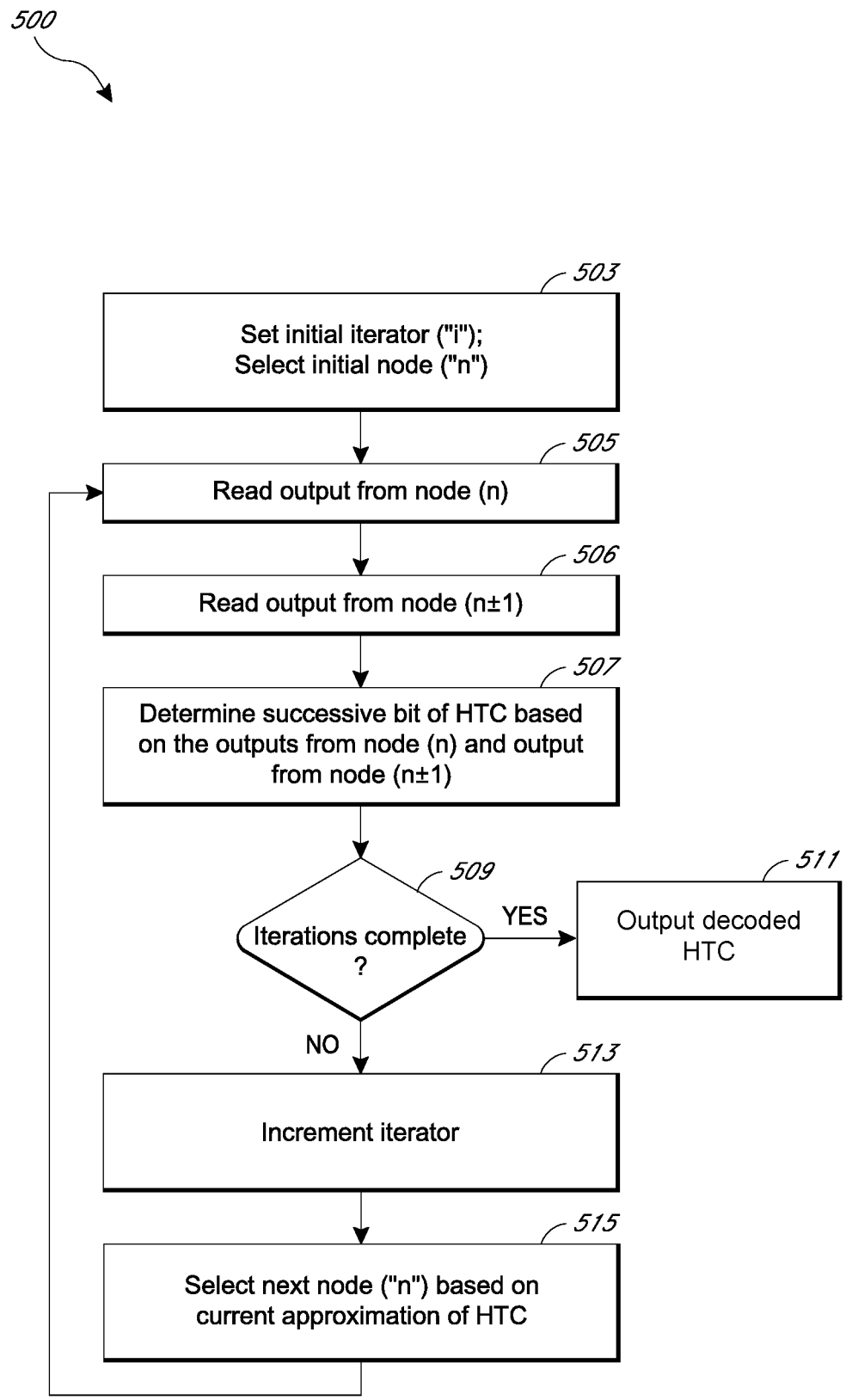
FIG. 5 shows a flow diagram of an example process for decoding half turns from outputs of a multi-turn sensor using a successive approximation readout technique according to an embodiment.
Figure 6:
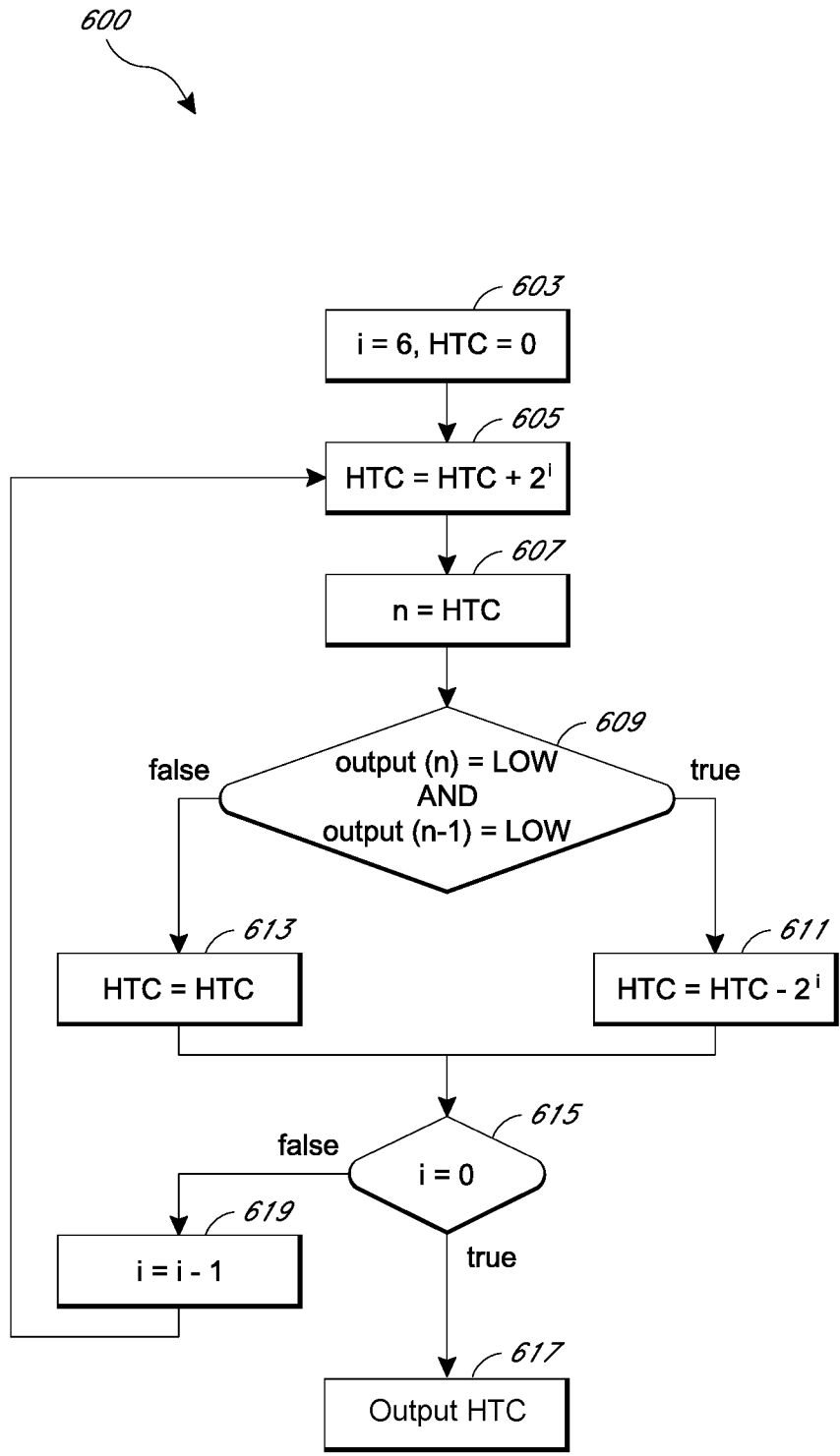
FIG. 6 shows a flow diagram of an example process for decoding half turns from outputs of a multi-turn sensor using a successive approximation readout technique according to an embodiment.

In various embodiments, the successive readings can be changed based on which end (the interior or exterior end) of a GMR spiral the DWG is located, whether clockwise or counter clockwise turns are being counted, the values of power rails such as Vcc and GND, and the like. A flowchart showing an example of a successive approximation readout technique is shown in FIG. 5. A flowchart showing a more specific example of a successive approximation readout technique is shown in FIG. 6. An example showing signal levels at nodes of a GMR spiral is discussed with respect to FIG. 7.

Figure 4:
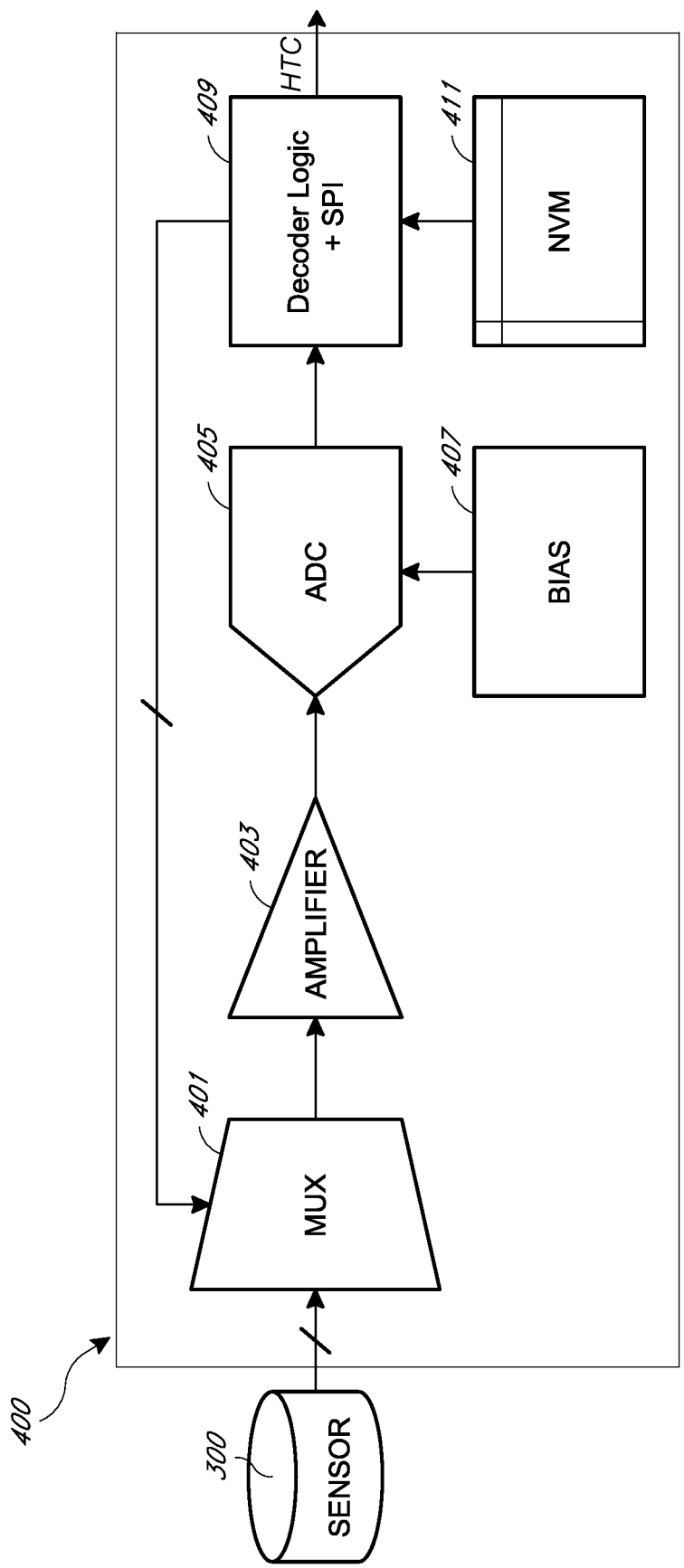
FIG. 4 shows an example circuit for decoding a turn count of the multi-turn sensor of FIG. 3 according to an embodiment.

FIG. 4 shows an example decoder circuit 400 for reading pairs of voltages from the multi-turn sensor 300 of FIG. 3 and decoding the turn count of the multi-turn sensor 300. The decoder circuit 400 outputs a half-turn count HTC based on readings from the multi-turn sensor 300. The illustrated decoder circuit 400 includes a multiplexer (MUX) 401, an amplifier 403, an analog-to-digital converter (ADC) 405, a bias controller 407, a decoder logic circuit and interface 409, and non-volatile memory (NVM) 411.

From the multi-turn sensor 300, each of the nodes (such as nodes $N_0$-$N_{15}$ shown in FIG. 3) is electrically coupled to a different input of the multiplexer 401. The multiplexer 401 is configured to select one of the nodes of the multi-turn sensor 300 to be electrically coupled through the output of the multiplexer 401 to the amplifier 403. In some embodiments, the amplifier 403 can be a programmable gain amplifier (PGA). Accordingly, a voltage from one of the nodes of the multi-turn sensor 300 is selected to be provided to the input of the amplifier 403.

The amplifier 403 is configured to amplify the voltage received at the amplifier input and to generate an amplified signal at the output of the amplifier 403. The amplified signal is provided to the input of the ADC 405. The amplifier 403 can be biased using a bias network 407. In some embodiments, the ADC 405 can be a 1 bit ADC, such as a comparator, and the bias network 407 can provide a reference voltage to be compared against.

The output of the ADC 405 can be a digital output signal that indicates a measurement or range of the voltage received at the input of the ADC 405. The ADC 405 can output different values for the digital output signal to distinguish between receiving low, medium, or high voltages. For example, the ADC can output b'01 (in which b'01 denotes bits 01) in response to detecting a low voltage (such as below −50 mV or within other thresholds), output b'10 in response to detecting a medium voltage (such as from −50 mV to 50 mV or within other thresholds), and output b'11 in response to detecting a high voltage (such as 50 mV or higher or within other thresholds). In some embodiments that include a comparator for the ADC 405, the output of the ADC 405 can indicate whether the voltage at the input of the ADC 405 is greater than or lower than a reference voltage provided by the bias circuit 407. Accordingly, the ADC 405 is configured to detect or measure the voltage from a selected node of the multi-turn sensor 300 and generate a digital output signal based at least in part on the voltage of the selected node of the multi-turn sensor 300. In some embodiments, different voltage thresholds can be used for different resistive segments of the multi-turn sensor 300. The different voltage thresholds can account for the different lengths of the resistive segments. For example, as shown in FIG. 2, resistor R13 is longer than R1. Additionally or alternatively, a different gain can be applied to the amplifier 403 to calibrate for the variations in the resistances of different segments.

The decoder logic circuit and interface 409 can receive and decode the digital output signals. For example, this can involve decoding according to any suitable features discussed with references to the flowcharts shown in FIG. 5 and FIG. 6, respectively. In some embodiments, the decoder logic circuit and interface 409 can include a statement machine implementation of features discussed with reference to the flowcharts of FIGS. 5 and/or 6 and/or a digital processor programmed to implement features discussed with reference the flowcharts of FIGS. 5 and/or 6. The decoder logic circuit and interface 409 can include a communications interface such as a serial peripheral interface (SPI) or other suitable interface to output a detected turn count, such as a half turn count (HTC).

The decoder logic circuit can also include logic to set the value for the control signal provided to the multiplexer 401. The control signal can be set to sequentially select the nodes of the multi-turn sensor 300 for voltage detection according to a successive approximation readout technique. For example, the control signal can be configured to select the nodes as indicated in block 505 of FIG. 5 and/or block 609 of FIG. 6. Accordingly, a sequence of nodes can be selected to quickly and efficiently decode the turn count of the multi-turn sensor 300.

A non-volatile memory (NVM) 411 can be used to store calibration values for other components of the decoder circuit 400, such as a gain for the amplifier 403 and/or coefficients for calibrating an offset of each half bridge output voltage from various nodes of the multi-turn sensor 300. Calibration coefficients can include gains for applying to the amplifier 403 and/or different threshold voltages to be used for different resistor segments. In some embodiments, the NVM 411 can store a lookup table for referencing to decode a half turn count according to measured voltages. In some embodiments, the NVM 411 can store an indication of the voltage value as the voltages are read from different nodes. When a successive approximation readout depends on a voltage value of a node that has been read during the same decoding process and is stored in the NVM 411, the stored voltages can be read from the NVM 411 instead of re-reading the voltage from the node on the multi-turn sensor 300.

Various embodiments of the decoder circuit 400 can include more or fewer elements. For example, a parallel path can be added to select and read voltages from two or more nodes of the multi-turn sensor 300 at a time. This can include a first multiplexer and processing path for reading odd nodes and a second multiplexer and processing path for reading even nodes in parallel. In some embodiments, the amplifier or ADC can be omitted.

Successive Approximation Readout Technique

FIG. 5 shows a flow diagram of an example process 500 for decoding half turns from outputs of a multi-turn sensor using a successive approximation readout technique. The process 500 can be implemented by any suitable electronic circuitry configured to determine a half-turn count (HTC) from a multi-turn sensor output, such as the multi-turn sensor 300 shown in FIG. 3. The HTC can be decoded into a binary number. The successive approximation readout method can be implemented in a variety of different ways for a variety of multi-turn sensors. For example, voltages may be detected as high or low, numbers can be added or subtracted, numbers can be initialized differently, etc. based on which end of a spiral the DWG is located, based on whether clockwise or counterclockwise turns are considered as "positive" turns, based on an initialized state of the magnetoresistive elements, based on how the nodes are numbered, and based on other factors. A specific example of an implementation of the example process 500 is discussed with respect to FIG. 6.

At block 503, an initial iterator (i) can be set, and an node number "n" (e.g., $N_n$) of the multi-turn sensor can be selected. The iterator can be set to a number of iterations sufficient to determine the HTC using a successive approximation readout technique. The iterator can be set to an integer indicating a number of bits sufficient to represent a maximum HTC in binary. For example, if the decoder is configured to count 0 to 63 half turns as a binary number using bits [5:0], then the iterator can be set to the number of bits that can represent a full turn count or equivalently one less than the number of bits that can represent the half turn count. For example, the iterator can be set to 5 or 6. In various embodiments, the iterator can count up or down. For example, the iterator can start at 0 and count up. The iterator can be initialized to any number useful for tracking a number of iterations.

The node number n is selected to have a voltage measured and/or detected. For example, with respect to FIGS. 3 and 4, a node $N_8$ (n=8) can be selected by setting an appropriate value for the control signal provided to the multiplexer 401. An initial value for n can be selected as any of the nodes. In certain embodiments, n can be selected to be a number that is approximately the value of the most significant bit of the HTC, such as the value of the MSB+/−1. For example, if the maximum HTC is decimal 30, then the HTC can be represented with a five bit binary number [4:0] because $2^5$=32, which is greater than 30. Because $2^{MSB}=2^4=16$, the node $N_{16}$ (n=16) can be selected as the initial node. In some other embodiments, the node can be selected to be about half of the maximum possible HTC according to the numbering scheme shown in FIG. 3.

At block 505, the output from node number n can be read. The output can be a half bridge voltage output or Wheatstone bridge voltage output. The voltage measurement can be read using a voltmeter, analog to digital converter, comparator, or other indicator of voltage.

At block 506, the output from node n±1 according to the numbering scheme of nodes shown in FIG. 3 can be read. For example, if the output from node $N_8$ of FIG. 3 was read at block 505, then the output from node $N_7$ of FIG. 3 can also be read at block 506. Whether 1 is added to or subtracted from n can depend on the initially selected node (e.g., if $N_7$ is selected at block 505), how the nodes are numbered, and other similar considerations. The outputs can be a voltage measurement that is read using a voltmeter, analog-to-digital converter, comparator, or other indicator of voltage.

At block 507, a successive bit of the HTC can be determined based on the outputs of node n and node n±1 that were read at block 505 and block 506. For the first iteration of "i," the successive bit can be the most significant bit of the HTC. In successive iterations, the successive bit can be the next most significant bit of the HTC. In some embodiments, the successive bit can be set to 1 if both of the voltage outputs of node n and node n±1 are low, otherwise the successive bit can be set to 0. The successive bit of the HTC can be set to 1 or 0 depending on whether or not both the nodes n and n±1 are low or high. The particular implementation can depend on the setup, such as the connections of the power rails and/or other factors. In some instances, a full readout of all voltages of all nodes for all half turns can be measured, and the decision at block 507 can be based on which voltage readouts of certain node pairs are unique to which specific HTC counts.

At block 509, it can be determined if the iterations are complete. If the number of iterations sufficient to decode all bits of the HTC has been completed, then block 509 can proceed to block 511. At block 511, the decoded turn count of the multi-turn sensor can be output. Otherwise, block 509 can proceed to block 513.

At block 513, the iterator can be incremented. For example, the iterator can be added to or subtracted from, depending on whether the iterator is counting up or down.

At block 515, a next node number "n" is selected. The number "n" can be selected based at least in part on the output of node n and the output of node n±1 from block 507 of the latest iteration. Because the outputs of node n and n±1 can be used at block 507 to set the currently approximated value of the HTC, the next node number "n" can also be selected based on the current HTC approximation. In some embodiments, the next node number n can be changed by adding or subtracting a value of a next most significant bit. For example, if n is presently equal to 16, then N+8 (which is 24) or N−8 (which is 8) can be selected as the node number, depending on the values of the voltage outputs of $N_n$ and $N_{n\pm1}$ detected at blocks 505 and 506. In some embodiments, the next node number n can be selected to be about halfway between the present value of n and the maximum HTC or about halfway between the present value of N and the minimum HTC, depending on the values of the voltage outputs of $N_n$ and $N_{n\pm1}$ detected at blocks 505 and 506. Whether the number n is increased or decreased can depend on the setup. In the event that a next value for n falls outside of a valid range of nodes, then the changes to the HTC can be disregarded for the next iteration. After the node number n is selected at block 515, the next iteration of block 505 can proceed.

Successive Approximation Readout Examples

FIG. 6 shows a flow diagram of an example process 600 for decoding half turns of a multi-turn sensor using a successive approximation readout technique. The process 600 can be implemented by any suitable electronic circuitry configured to determine a half-turn count (HTC) from an example multi-turn sensor output. The process 600 is discussed with respect to an example multi-turn sensor that can count 40 full turns and is configured to determine a HTC from 0 to 79. The HTC can be decoded into a binary number with bits [6:0]. The example multi-turn sensor includes a DWG located on the outside of the spiral, and the multi-turn sensor can be configured to count counterclockwise turns for "positive" turns of a magnetic target. The nodes are numbered from 0 to 79, with node 0 starting at the exterior loop of the spiral.

At block 603, an initial iterator (i) can be set to 6, and the HTC can be initialized to zero. The maximum HTC is 79, which can be represented by a 7 bit number (1001111), in this example. Bit 6 of the HTC that includes bits [6:0] is the most significant bit, and bit 0 of the HTC is the least significant bit. The iterator i can be initialized to 6, which is the position of the most significant bit.

At block 605, the HTC is changed by adding $2^i$ to the previous value of HTC. For the first iteration, the initial HTC of 0 is changed by adding $2^6$ to 0, which equals 64, such that the HTC is set to 64.

At block 607, n is set to the value of the HTC. For the first iteration, n is set to the value of the HTC determined in block 605 such that node $N_{64}$ according to the numbering scheme shown in FIG. 3 applied to a spiral with more turns is selected. For subsequent iterations (e.g., other than the first iteration), n can be set to the value of the updated value of HTC as determined in blocks 611 or 613. Accordingly, for subsequent iterations (e.g., other than the first iteration) the value of n as set in block 607 depends, at least in part, on a previous measurement of the multi-turn sensor measured at block 609.

At block 609, the half bridge voltage outputs from node n and from node n−1 according to the numbering scheme shown in FIG. 3 applied to a spiral with more turns can be read. If the half bridge voltage outputs from node n and from node n−1 are both low, then block 609 proceeds to block 611, otherwise block 609 proceeds to block 613. In the process 600, a decision at block 609 and the subsequent computation at either block 611 or block 613 can determine each bit of the HTC.

At block 611, the HTC is changed by subtracting $2^i$ from the previous value of HTC, effectively undoing the change at block 605. For the first iteration, if block 611 is performed, value of HTC would be set to $64-2^6$, which equals 0, such that the most significant bit of the HTC is set to 0.

At block 613, the HTC remains unchanged. For the first iteration, if block 613 is performed, the most significant bit of the HTC remains set as 1. It is recognized that in some embodiments, a mathematically equivalent process can be performed without block 605 if block 609 is changed to "HTC=HTC+$2^i$," block 611 is changed to "HTC=HTC," and block 607 indicates that N is set to HTC+$2^i$.

At block 615, it can be determined if the iterator indicates that the HTC has been fully decoded, which occurs when the iterator is equal to zero in the process 600. If so, then block 615 can proceed to output the decoded half turn count at block 617. Otherwise, block 615 can proceed to block 619.

At block 619, the iterator can be decremented by 1, thus beginning the next iteration. Block 619 can then proceed to block 605 such that blocks 605-615 are performed again to determine a next successive bit of the HTC.

Figure 7:
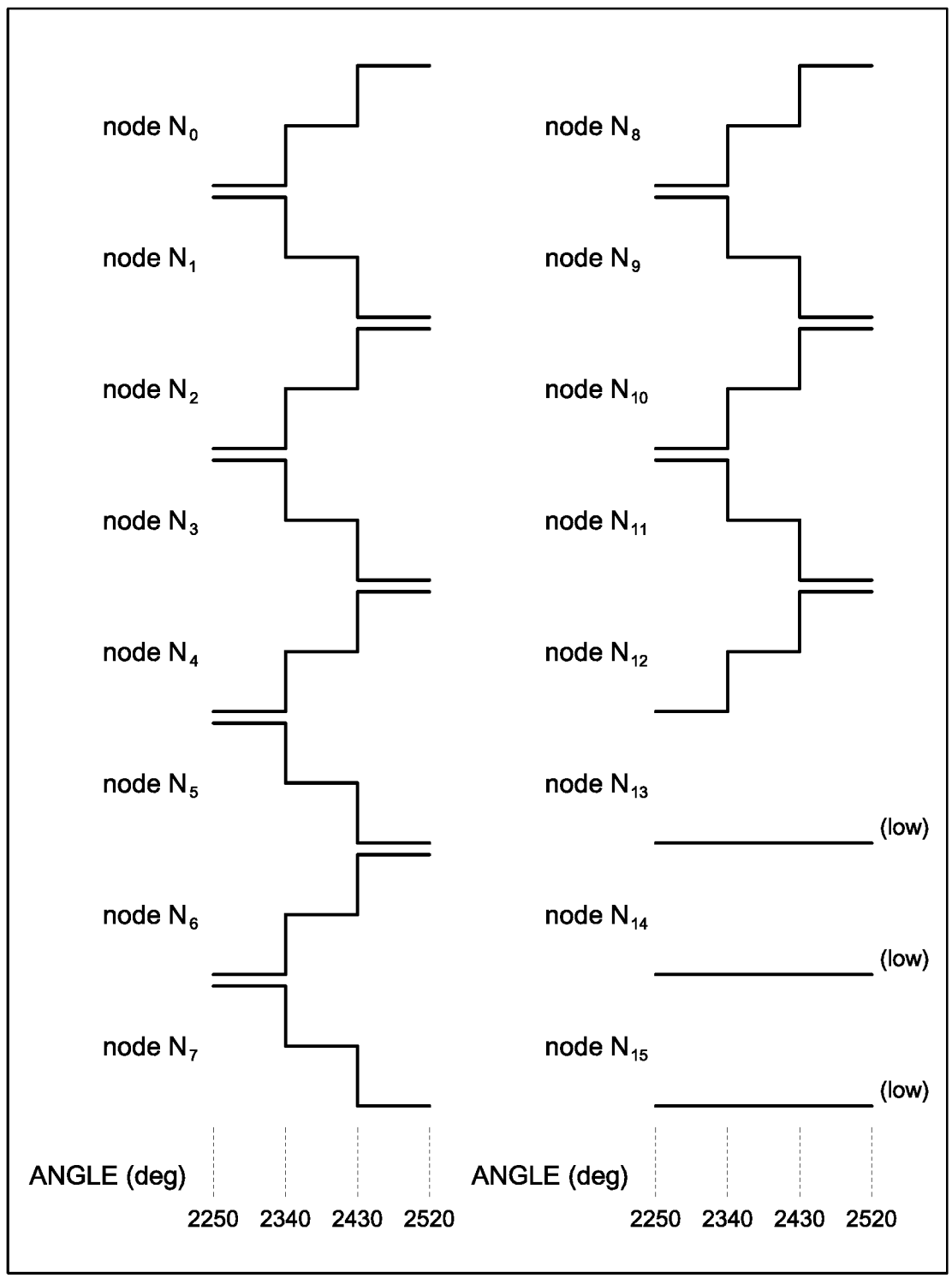
FIG. 7 shows example voltage outputs from various nodes of a multi-turn sensor FIG. 3.

FIG. 7 shows example voltage outputs from various nodes of a multi-turn sensor. FIG. 7 is based on an example multi-turn sensor for counting 0 to 15 half turns, such as sensor 300 shown in FIG. 3. Half bridge voltage outputs are shown for each node $N_0$-$N_{15}$ of FIG. 3. Nodes $N_0$-$N_7$ are shown in a first column, and nodes $N_9$-$N_{15}$ are shown in a second column. At the bottom of each column, an axis indicates a turn angle from 2250 degrees to 2520 degrees. For reference, 2340°/180°=13 half turns. Each of the voltage outputs for the nodes $N_0$-$N_{15}$ are shown as a low, medium, or high voltage across the corresponding range of turn angles indicated by the axis. It will be understood that the nodes $N_0$-$N_{15}$ can have other voltage outputs outside of the illustrated range of turn angles. Unless indicated as binary, all numbers are in decimal format. To provide additional clarity, some decimal numbers may be specifically indicated as decimal using the "dec" suffix and binary numbers are preceded by "b".

As a first example, the process shown in FIG. 6 can be used to decode the voltage outputs to determine a half turn count in four iterations when the magnetic target has been turned to 2300 degrees. Accordingly, for each node, the voltage values of low, medium, or high can be read along an axis section between 2250 and 2340. The HTC can be decoded into a four bit number represented by bits [3:0]. Accordingly, at block 603, i can be initialized to 3, and the HTC is set to b'0000=0dec.

In a first iteration (i=3), at block 605, HTC is set to $0+2^3$ such that the HTC=b'1000=8dec. At block 607, node number n=HTC is selected so that n=8. At block 609, the half bridge voltage outputs of nodes $N_8$ and $N_7$ of the multi-turn sensor 300 of FIG. 3 are read. According to the output graphs, the voltage output for node $N_8$ is low and the voltage output for node $N_7$ is high. Accordingly, the decision in block 609 is false, and block 609 proceeds to block 613, where the HTC remains unchanged. At block 615, the iterations are not complete, and at block 619, the iterator i decrements by 1 such that i=2.

In a second iteration (i=2), at block 605, HTC is set to $8+2^2$ such that the HTC=b'1100=12dec. At block 607, node number n=HTC is selected so that n=12. At block 609, the half bridge voltage outputs of nodes $N_{12}$ and $N_{11}$ of the multi-turn sensor 300 of FIG. 3 are read. According to the output graphs, the voltage output for node $N_{12}$ is low and the voltage output for node $N_{11}$ is high. Accordingly, the decision in block 609 is false, and block 609 proceeds to block 613, where the HTC remains unchanged. At block 615, the iterations are not complete, and at block 619, the iterator i decrements by 1 such that i=1.

In a third iteration (i=1), at block 605, HTC is set to $12+2^1$ such that the HTC=b'1110=14dec. At block 607, node number n=HTC is selected so that n=14. At block 609, the half bridge voltage outputs of nodes $N_{14}$ and $N_{13}$ of the multi-turn sensor 300 of FIG. 3 are read. According to the output graphs, the voltage output for node $N_{14}$ is low and the voltage output for node $N_{13}$ is low. Accordingly, the decision in block 609 is true, and block 609 proceeds to block 611, where the HTC is set to $14-2^1$ such that the HTC=b'1100=12dec. At block 615, the iterations are not complete, and at block 619, the iterator i decrements by 1 such that i=0.

In a fourth iteration (i=0), at block 605, HTC is set to $12+2^0$ such that the HTC=b'1101=13dec. At block 607, node number n=HTC is selected so that n=13. At block 609, the half bridge voltage outputs of nodes $N_{13}$ and $N_{12}$ of the multi-turn sensor 300 of FIG. 3 are read. According to the output graphs, the voltage output for node $N_{13}$ is low and the voltage output for node $N_{12}$ is low. Accordingly, the decision in block 609 is true, and block 609 proceeds to block 611, where the HTC is set to $13-2^0$ such that the HTC=b'1100=12dec. At block 615, the iterations are complete, and the HTC is decoded as 12 half turns, which corresponds to 2300° as 2300° is more than 12 half turns (2160°) and less than 13 half turns (2340°). The half turn count is output at block 617.

In some embodiments, the voltage for $N_{13}$ can be stored in a memory (such as the NVM 411 of FIG. 4) during the third iteration. As part of the fourth iteration, the voltage for $N_{13}$ can be read from the memory instead of re-measuring the voltage from the node on the multi-turn sensor. This can result in reduced power consumption and/or reduced time to decode a half turn count in certain instances.

As a second example, the process shown in FIG. 6 can be used to decode the voltage outputs to determine a half turn count in four iterations when the magnet target has been turned to 2400 degrees, which corresponds to a half turn count of 13. Accordingly, for each node, the voltage values of low, medium, or high can be read along an axis section between 2340 and 2430. The HTC can be decoded into a four bit number represented with bits [3:0]. Accordingly, at block 603, i can be initialized to 3, and the HTC is set to b'0000=0dec.

In a first iteration (i=3), at block 605, HTC is set to $0+2^3$ such that the HTC=b'1000=8dec. At block 607, node number n=HTC is selected so that n=8. At block 609, the half bridge voltage outputs of nodes $N_8$ and $N_7$ of the multi-turn sensor 300 of FIG. 3 are read. According to the output graphs, the voltage output for node $N_8$ is low and the voltage output for node $N_7$ is high. Accordingly, the decision in block 609 is false, and block 609 proceeds to block 613, where the HTC remains unchanged. At block 615, the iterations are not complete, and at block 619, the iterator i decrements by 1 such that i=2.

In a second iteration (i=2), at block 605, HTC is set to $8+2^2$ such that the HTC=b'1100=12dec. At block 607, node number n=HTC is selected so that n=12. At block 609, the half bridge voltage outputs of nodes $N_{12}$ and $N_{11}$ of the multi-turn sensor 300 of FIG. 3 are read. According to the output graphs, the voltage output for node $N_{12}$ is low and the voltage output for node $N_{11}$ is high. Accordingly, the decision in block 609 is false, and block 609 proceeds to block 613, where the HTC remains unchanged. At block 615, the iterations are not complete, and at block 619, the iterator i decrements by 1 such that i=1.

In a third iteration (i=1), at block 605, HTC is set to $12+2^1$ such that the HTC=b'1110=14dec. At block 607, node number n=HTC is selected so that n=14. At block 609, the half bridge voltage outputs of nodes $N_{14}$ and $N_{13}$ of the multi-turn sensor 300 of FIG. 3 are read. According to the output graphs, the voltage output for node $N_{14}$ is low and the voltage output for node $N_{13}$ is low. Accordingly, the decision in block 609 is true, and block 609 proceeds to block 611, where the HTC is set to $14-2^1$ such that the HTC=b'1100=12dec. At block 615, the iterations are not complete, and at block 619, the iterator i decrements by 1 such that i=0.

In a fourth iteration (i=0), at block 605, HTC is set to $12+2^0$ such that the HTC=b'1101=13dec. At block 607, node number n=HTC is selected so that n=13. At block 609, the half bridge voltage outputs of nodes $N_{13}$ and $N_{12}$ of the multi-turn sensor 300 of FIG. 3 are read. According to the output graphs, the voltage output for node $N_{13}$ is low and the voltage output for node $N_{12}$ is medium. Accordingly, the decision in block 609 is false, and block 609 proceeds to block 613, and the HTC remains unchanged. At block 615, the iterations are complete, and the HTC is decoded as 13 half turns. This half turn count is output at block 617.

As illustrated by the two examples discussed above with reference to FIG. 7, the HTC can be decoded after reading voltage outputs from 7 different nodes, despite the multi-turn sensor having 16 different nodes. Accordingly, the readouts can be more than twice as fast and consume less than half of the power in comparison to reading the voltage outputs from all of the nodes.

Example Magnetic Angle Sensor Systems

Figure 8A:
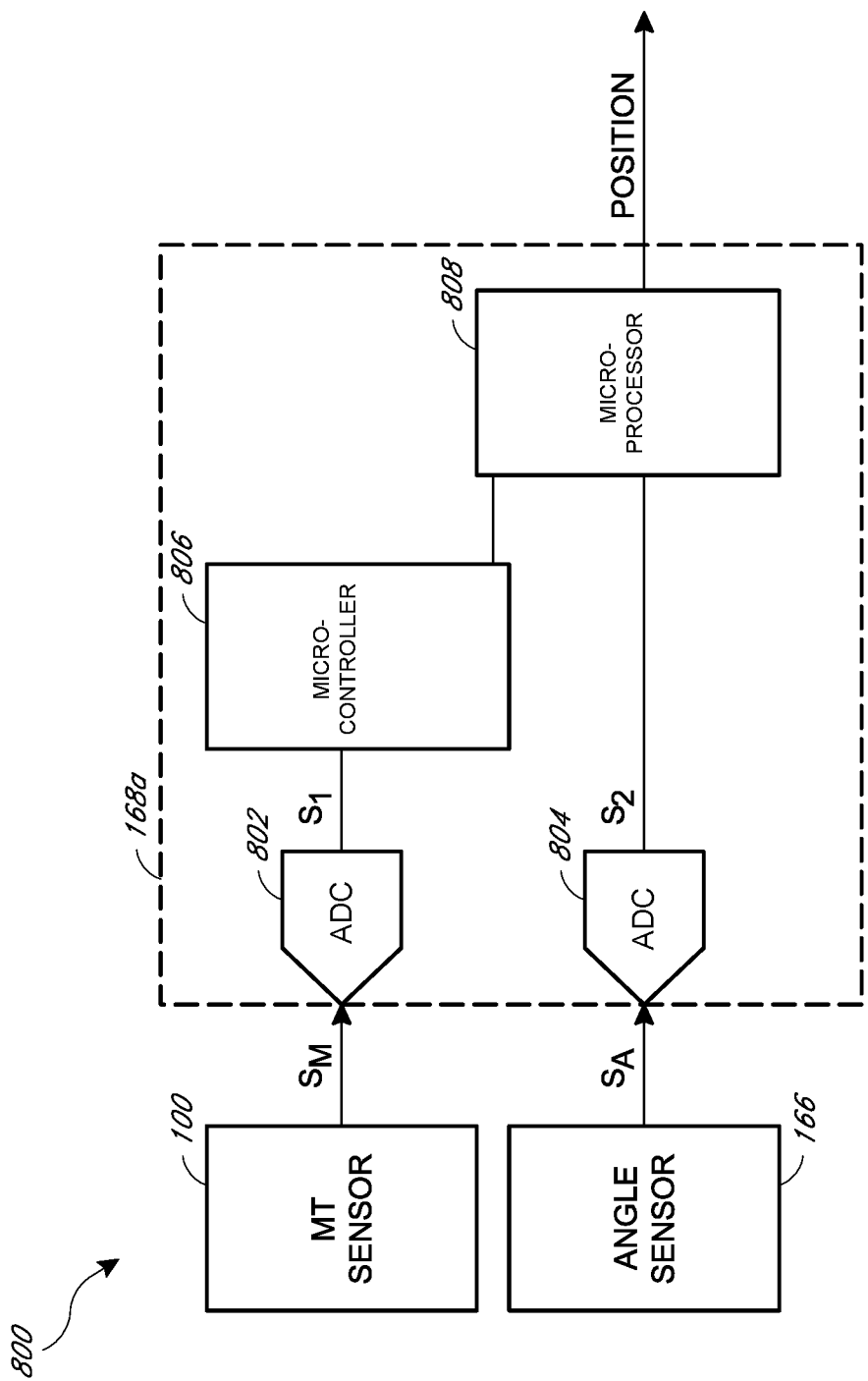
FIG. 8A is a schematic block diagram of a magnetic angle sensor system that includes a multi-turn sensor, angle sensor, and a processor according to an embodiment.

FIG. 8A is a schematic block diagram of a magnetic angle sensor system 800 that includes a multi-turn sensor 100, an angle sensor 166, and a processor 168a according to an embodiment. As illustrated, the processor 168a includes an analog-to-digital converter (ADC) 802, an ADC 804, a microcontroller 806, and a microprocessor 808. In the embodiment of FIG. 8A, the processor 168a receives signals $S_M$ from the multi-turn sensor 100 and signals $S_A$ from the angle sensor 166. The signals $S_M$ and $S_A$ can be analog signals such as voltage signals from Wheatstone bridges. The signals $S_M$ from the multi-turn sensor 100 can be converted to digital signals $S_1$ by the ADC 802, and the signals $S_A$ from the angle sensor 166 can be converted to digital signals $S_2$ by the ADC 804. The ADC 804 provides the digital signals $S_2$ to the microcontroller 806, which in turn can convert and process this information. The microprocessor 808 can combine both the angle output data $S_2$ from the ADC 804 and the digital signals $S_1$ from the ADC 802 to calculate the overall rotation angle position data Position. The microcontroller 806 can decode the output of the multi-turn sensor 100 to determine a half-turn count. The microcontroller 806 can include a decoder arranged to decode a turn count of the multi-turn sensor in accordance with any suitable principles and advantages discussed herein. For example, the microcontroller 806 can include a half-turn decoder configured to read and decode pairs of signals $S_M$ from the multi-turn sensor 100 as disclosed herein. In some embodiments, the ADC 802 can be configured to detect whether a voltage is "low" or "high" in accordance with the SAR technique. Accordingly, in some embodiments, the ADC 802 can be implemented as a 1 bit voltage threshold detector or comparator.

Figure 8B:
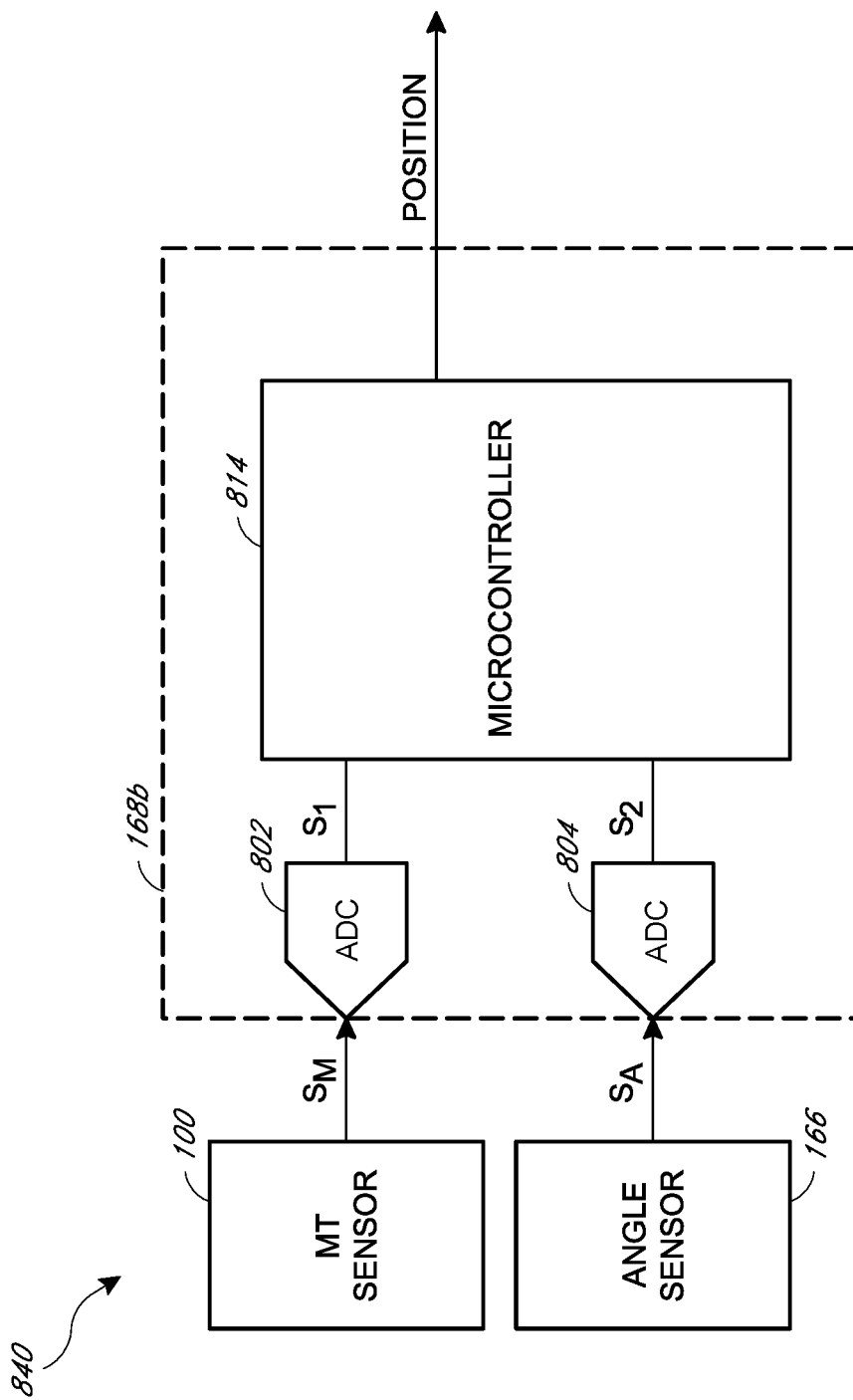
FIG. 8B is a schematic block diagram of a magnetic angle sensor system that includes a multi-turn sensor, angle sensor, and a processor according to another embodiment.

FIG. 8B is a schematic block diagram of a magnetic angle sensor system 840 including the multi-turn sensor 100, the angle sensor 166, and a processor 168b according to another embodiment. The processor 168b is similar to the processor 168a of FIG. 8A except it includes a microcontroller 814. The microcontroller 814 can implement any suitable principles and advantages of the processing circuit 168 of FIG. 1.

Figure 8C:
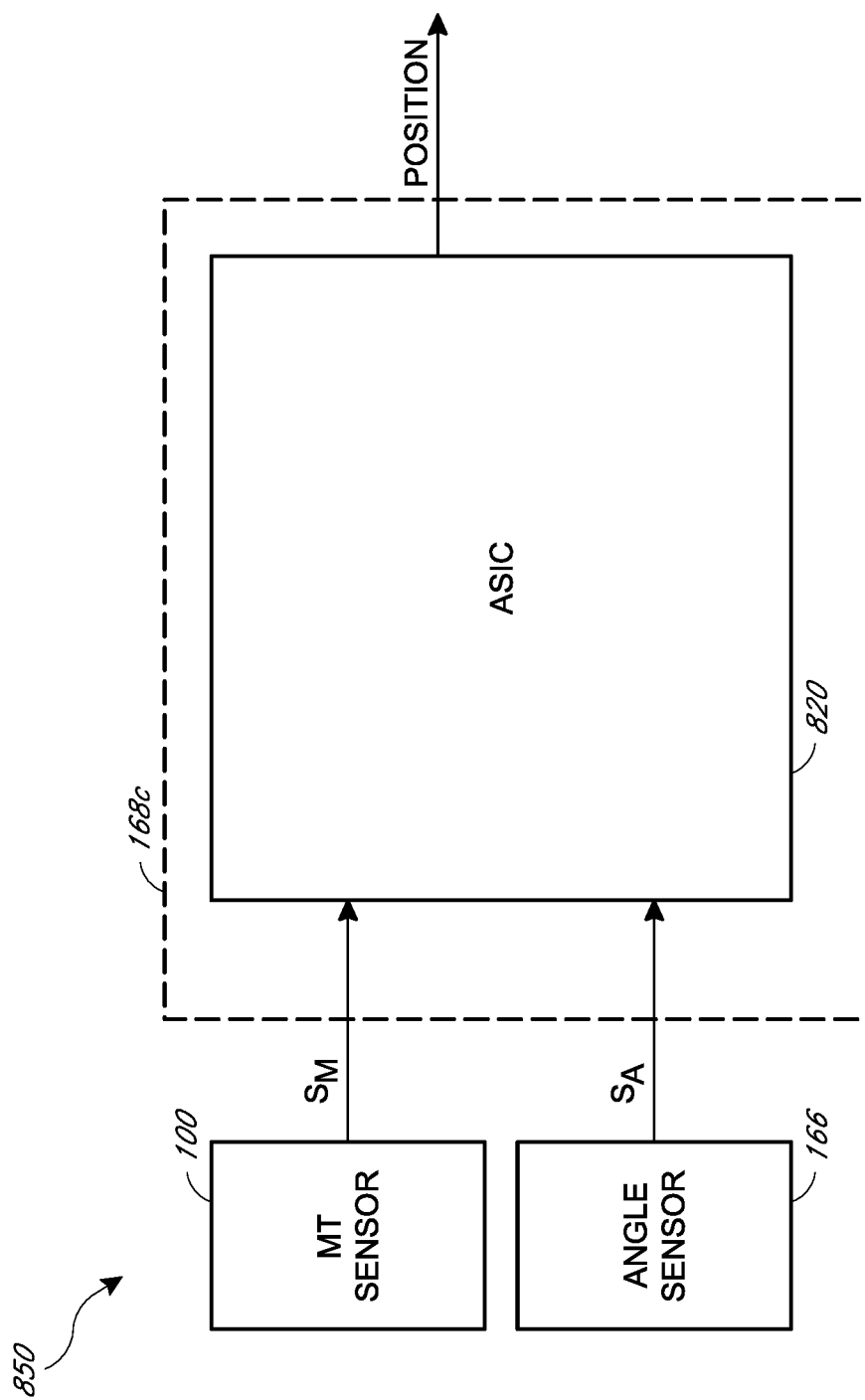
FIG. 8C is a schematic block diagram of a magnetic angle sensor system that includes a multi-turn sensor, angle sensor, and a processor according to another embodiment.

FIG. 8C is a schematic block diagram of a magnetic angle sensor system 850 including the multi-turn sensor 100, the angle sensor 166, and a processor 168c according to an embodiment. The processor 168c is similar to the processors 168a and 168b except that the process 168c includes an ASIC 820 to processes outputs of the multi-turn sensor 100 and the angle sensor 166. The ASIC 820 can implement any suitable principles and advantages of the processing circuit 168 of FIG. 1. The ASIC 820 can compute the overall rotation angle position data Position. In the embodiment of FIG. 8C, ASIC 820 can be configured to read and decode pairs of signals $S_M$ from the multi-turn sensor 100 as disclosed herein. For example, the ASIC 820 can be a state machine implementation or digital logic implementation of the processes of FIG. 5 or FIG. 6. Although not every component is re-drawn, it will be understood that the systems of FIG. 8A, FIG. 8B, and FIG. 8C can include various implementations of the system 400 of FIG. 4.

Any of the principles and advantages discussed herein can be applied to other systems, not just to the systems described above. Some embodiments can include a subset of features and/or advantages set forth herein. The elements and operations of the various embodiments described above can be combined to provide further embodiments. The acts of the methods discussed herein can be performed in any order as appropriate. Moreover, the acts of the methods discussed herein can be performed serially or in parallel, as appropriate. While circuits are illustrated in particular arrangements, other equivalent arrangements are possible.

Any of the principles and advantages discussed herein can be implemented in connection with any other systems, apparatus, or methods that benefit could from any of the teachings herein. For instance, any of the principles and advantages discussed herein can be implemented in connection with any devices with a need for decoding a turn count of a multi-turn magnetic sensor.

Aspects of this disclosure can be implemented in various electronic devices, components and/or systems related to multi-turn sensing. For instance, decoding methods and decoder circuits implemented in accordance with any of the principles and advantages discussed herein can be included in various electronic systems, devices, and/or electronic components. For instance, aspects of this disclosure can be implemented in any electronic system, electronic device, and/or electronic component that could benefit from the technology disclosed herein. Examples of the electronic devices can include, but are not limited to, consumer electronic products, parts of the consumer electronic products, electronic test equipment, vehicular electronics systems, etc. Examples of the electronic devices can include, but are not limited to, computing devices, communications devices, electronic household appliances, automotive electronics systems, other vehicular electronics systems, industrial control electronics systems, medical systems or devices, etc. Further, the electronic devices can include unfinished products.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or "connected", as generally used herein, refer to two or more elements that may be either directly connected, or connected by way of one or more intermediate elements. Thus, although the various schematics shown in the figures depict example arrangements of elements and components, additional intervening elements, devices, features, or components may be present in an actual embodiment (assuming that the functionality of the depicted circuits is not adversely affected). The words "based on" as used herein are generally intended to encompass being "based solely on" and being "based at least partly on." Additionally, the words "herein," "above," "below," and words of similar import, when used in this application, shall refer to this application as a whole and not to any particular portions of this application. Where the context permits, words in the Detailed Description of Certain Embodiments using the singular or plural number may also include the plural or singular number, respectively. The words "or" in reference to a list of two or more items, is intended to cover all of the following interpretations of the word: any of the items in the list, all of the items in the list, and any combination of the items in the list. All numerical values or distances provided herein are intended to include similar values within a measurement error.

While certain embodiments have been described, these embodiments have been presented by way of example only, and are not intended to limit the scope of the disclosure. Indeed, the novel apparatus, systems, and methods described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A system for decoding a turn count of a multi-turn magnetic sensor, the system comprising:
   a multi-turn magnetic sensor comprising a magnetoresistive track, the multi-turn magnetic sensor configured to store a turn count; and
   a decoder circuit coupled to the magnetoresistive track, the decoder circuit comprising circuitry configured to couple to nodes of the magnetoresistive track, measure signals associated with voltages of at least some of the nodes using a successive approximation readout technique, and determine the turn count based at least in part on the measured signals;
   wherein the successive approximation readout technique comprises measuring signals associated with voltages of first nodes of the nodes, selecting a next node based at least in part on the signals associated with voltages of the first nodes, and measuring a signal associated with a voltage of the next node.

2. The system of claim 1, wherein the next node is selected based at least in part on whether the signals associated with the voltages of the first nodes each represent a voltage within a predefined range.

3. The system of claim 1, wherein the first nodes are associated with half-bridge circuits of the multi-turn magnetic sensor.

4. The system of claim 1, wherein the decoder circuit is configured to determine a most significant bit of the turn count in a first iteration of the successive approximation readout technique to determine the most significant bit of the turn count prior to determining other bits of the turn count.

5. The system of claim 1, wherein each bit of the turn count is determined based at least partly on a respective iteration of the successive approximation readout technique.

6. The system of claim 1, wherein the turn count is a quarter turn count.

7. The system of claim 1, wherein the turn count is a half turn count.

8. The system of claim 1, wherein the multi-turn magnetic sensor is configurable into a state representing 40 full turns.

9. The system of claim 1, wherein the decoder circuit comprises:
   a multiplexer configured to select a node from among the nodes of the magnetoresistive track;
   an analog-to-digital converter having an input coupled to an output of the multiplexer; and
   a decoder logic circuit having an input coupled to an output of the analog-to-digital converter, the decoder logic configured to determine the turn count.

10. The system of claim 1, further comprising an angle sensor, wherein the decoder circuit is included in a processing circuit, and wherein the processing circuit is configured to generate position data based at least in part on the turn count and an output of the angle sensor.

11. The system of claim 1, wherein the multi-turn magnetic sensor comprises a domain wall generator coupled to the magnetoresistive track.

12. The system of claim 1, wherein the magnetoresistive track is laid out in a shape of a spiral, and the nodes are at corners of the spiral.

13. A method of decoding a turn count of a multi-turn magnetic sensor that comprises a magnetoresistive track, the method comprising:
   measuring signals associated with voltages of first nodes of the magnetoresistive track;
   selecting a next node of the magnetoresistive track based at least in part on the signals associated with the voltages of the first nodes;
   measuring a signal associated with a voltage of next node of the magnetoresistive track; and
   decoding a turn count of the multi-turn magnetic sensor based at the signals associated with the voltages of with the first nodes least and the signal associated with the voltage of the next node.

14. The method of claim 13, wherein the next node is selected based at least in part on whether the signals associated with the voltages of the first nodes each represent a voltage within a predefined range.

15. The method of claim 13, wherein the decoding comprises determining a most significant bit of the turn count prior to determining other bits of the turn count.

16. The method of claim 13, wherein the turn count is a quarter turn count.

17. The method of claim 13, further comprising:
   determining an angle using an angle sensor; and
   generating position data based on the angle and the turn count.

18. A system for decoding a turn count of a multi-turn magnetic sensor, the system comprising:
   a multi-turn magnetic sensor comprising a magnetoresistive track, the multi-turn magnetic sensor configured to store a turn count; and
   means for decoding the turn count of the multi-turn magnetic sensor using a successive approximation readout technique;
   wherein the successive approximation readout technique comprises measuring signals associated with voltages of first nodes of the nodes, selecting a next node based at least in part on the signals associated with voltages of the first nodes, and measuring a signal associated with a voltage of the next node.

19. The system of claim 18, wherein the turn count is a quarter turn count.

20. The system of claim 18, further comprising an angle sensor, wherein the means for decoding is included in a processing circuit, and wherein the processing circuit is configured to generate position data based at least in part on the turn count and an output of the angle sensor.

* * * * *